United States Patent [19]
Uitz

[11] Patent Number: 5,918,743
[45] Date of Patent: Jul. 6, 1999

[54] REUSABLE CONTAINER

[75] Inventor: Mark O. Uitz, Mountain View, Calif.

[73] Assignee: Recyclable Containers Company, Mountain View, Calif.

[21] Appl. No.: 08/628,896

[22] Filed: Apr. 9, 1996

Related U.S. Application Data

[62] Division of application No. 08/440,527, May 12, 1995, Pat. No. 5,573,599, which is a division of application No. 08/125,488, Sep. 23, 1993, Pat. No. 5,450,962.

[51] Int. Cl.$^6$ .................................................. B65D 21/032
[52] U.S. Cl. ............................ 206/509; 220/7; 220/4.33; 220/648; 206/600; 206/511
[58] Field of Search .................... 220/6, 7, 4.33, 220/648, 666; 206/512, 511, 509, 503, 600

[56] References Cited

U.S. PATENT DOCUMENTS

| | | | |
|---|---|---|---|
| 3,060,943 | 10/1962 | Clayton | 134/8 |
| 3,675,808 | 7/1972 | Brink | 206/509 |
| 3,973,684 | 8/1976 | DiMartino | 206/512 |
| 3,987,924 | 10/1976 | Uitz | 220/4 F |
| 4,366,905 | 1/1983 | Forshee | 220/4.33 |
| 4,591,065 | 5/1986 | Foy | 220/7 |
| 4,599,131 | 7/1986 | Matuszak | 156/584 |
| 4,624,380 | 11/1986 | Warnette | 220/6 |
| 4,711,355 | 12/1987 | Veenman | 206/511 |
| 4,781,300 | 11/1988 | Long | 220/7 |
| 4,893,746 | 1/1990 | Swanhart et al. | 220/6 |
| 4,905,833 | 3/1990 | Kreeger et al. | 206/511 |
| 4,960,223 | 10/1990 | Chiang et al. | 220/7 |
| 4,998,637 | 3/1991 | Marovskis | 220/4.33 |
| 5,073,203 | 12/1991 | Al-Ghatta | 134/11 |
| 5,123,533 | 6/1992 | Uitz | 206/386 |
| 5,255,859 | 10/1993 | Peacock et al. | 241/79.1 |
| 5,328,042 | 7/1994 | Heise | 220/648 |
| 5,335,814 | 8/1994 | Hepp | 206/511 |
| 5,429,261 | 7/1995 | Machino | 220/7 |
| 5,443,652 | 8/1995 | Scarola et al. | 134/7 |
| 5,450,962 | 9/1995 | Uitz | 206/511 |

*Primary Examiner*—Stephen J. Castellano
*Attorney, Agent, or Firm*—Flehr Hohbach Test Albritton & Herbert LLP

[57] ABSTRACT

A reusable plastic container and a method of cleaning and sterilizing the same is described. The plastic container can be collapsed for transportation and sterilization when not in use. The container includes structural end frames which are made from the same material from which the remainder of the container is made. A band can be used when it is in its erected position to hold the same in such position. When collapsed, a container is flat and all parts of the same are exposed for easy washing and sterilization.

4 Claims, 5 Drawing Sheets

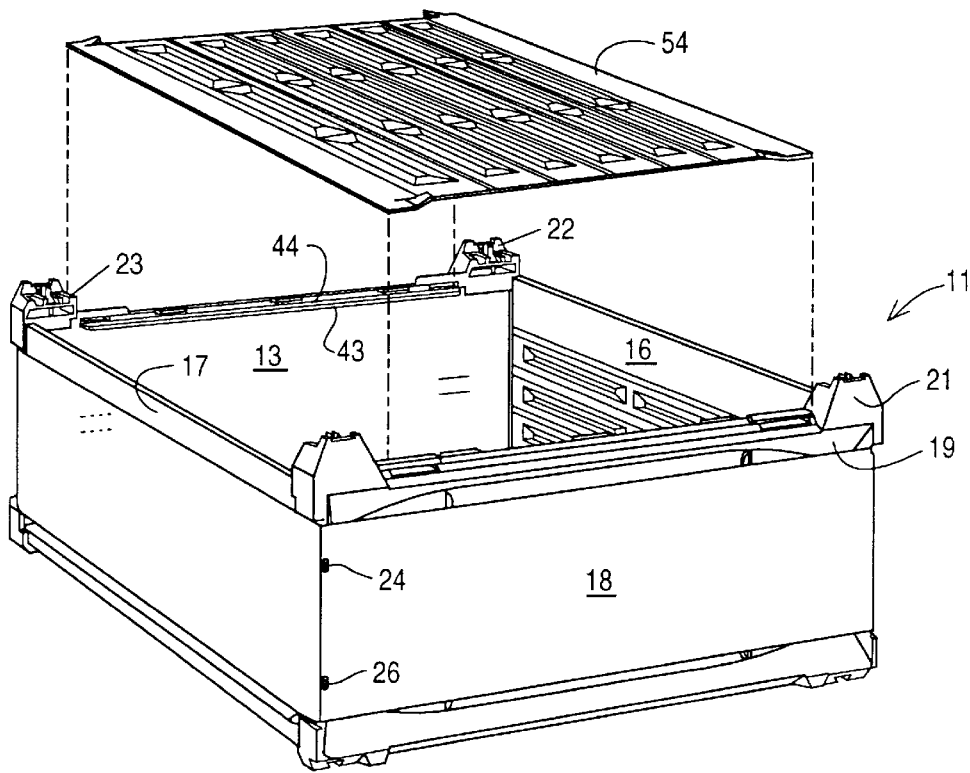
FIG_1
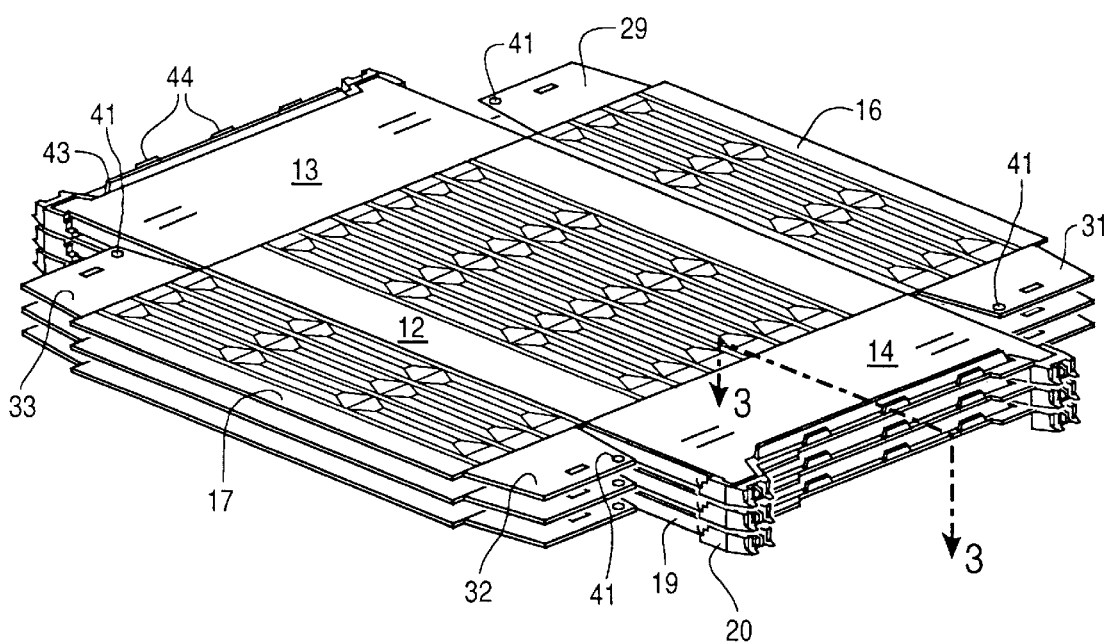
FIG_2

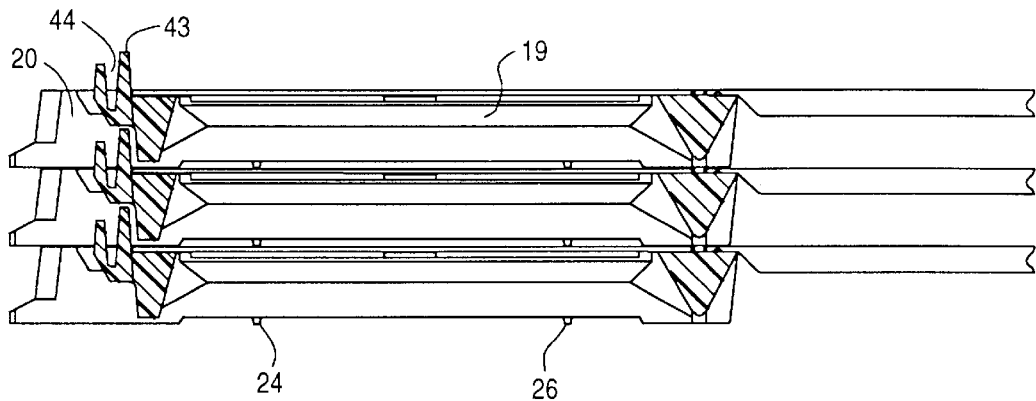
FIG_3
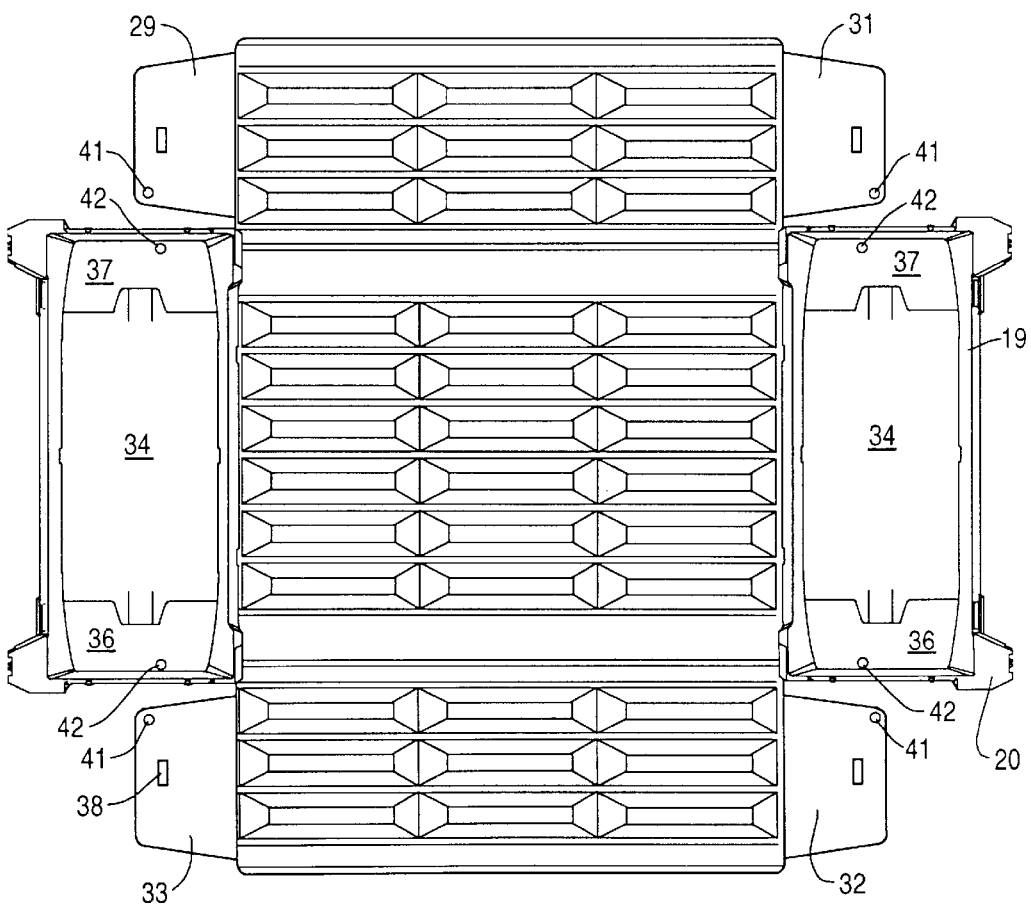
FIG_4

FIG_5
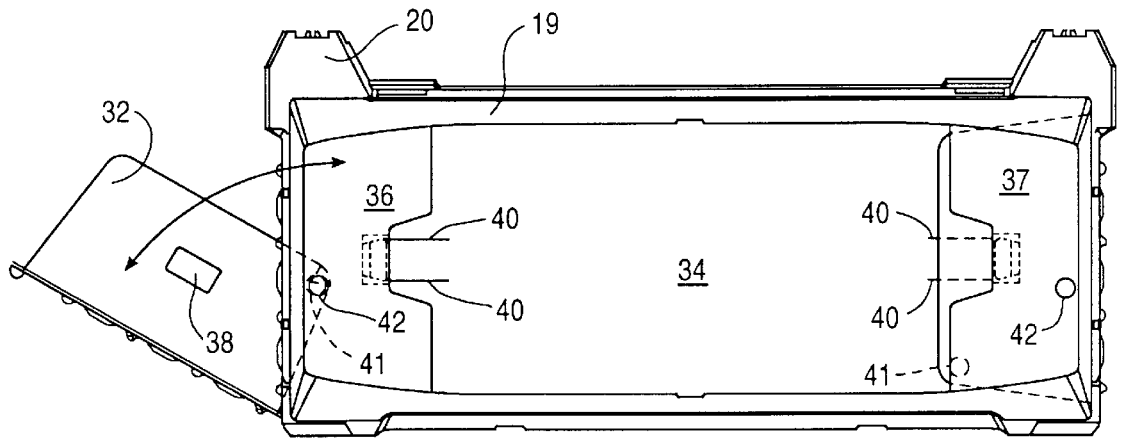
FIG_6A
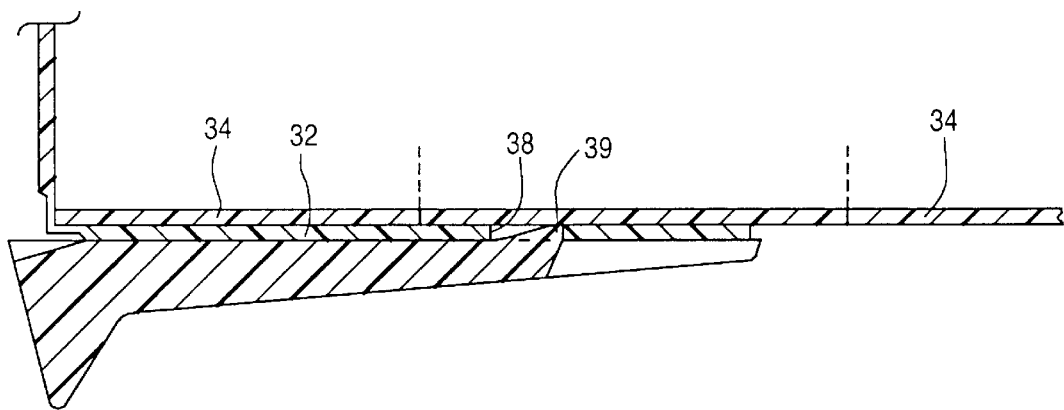
FIG_6B
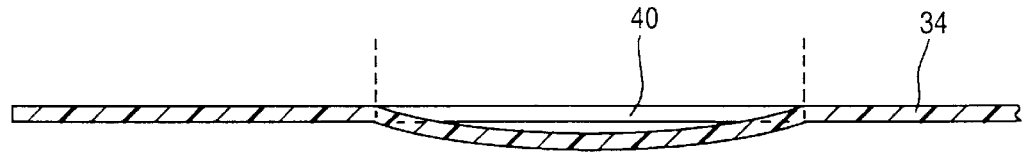

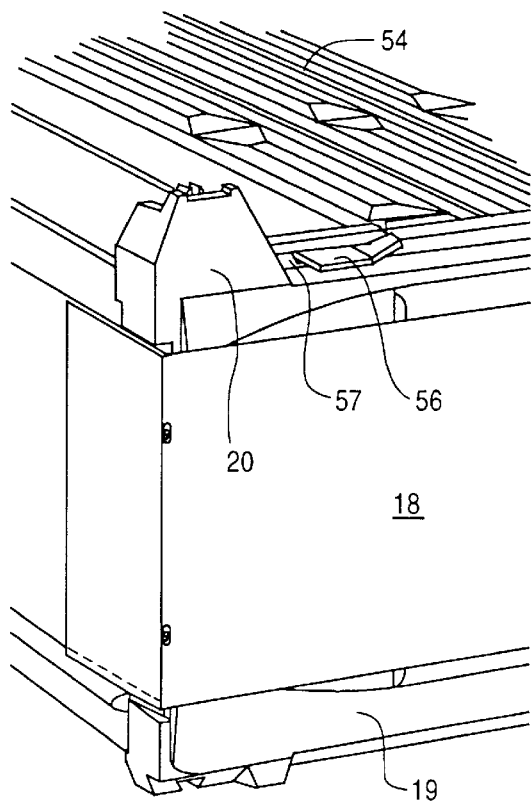
FIG_7
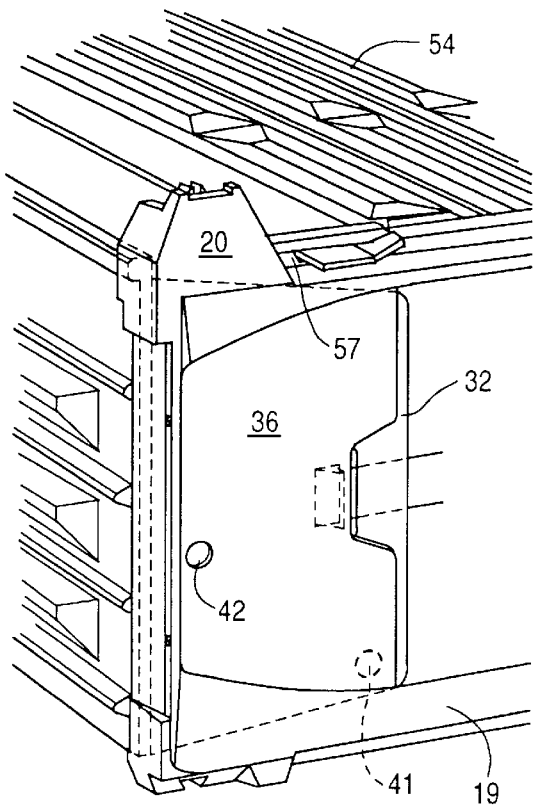
FIG_8
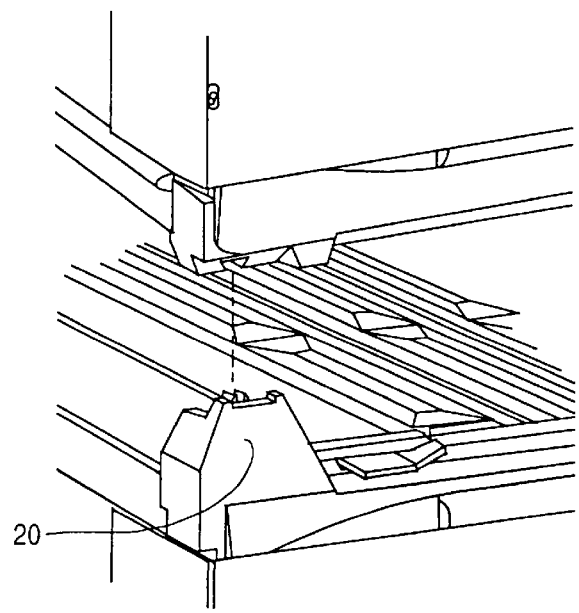
FIG_9

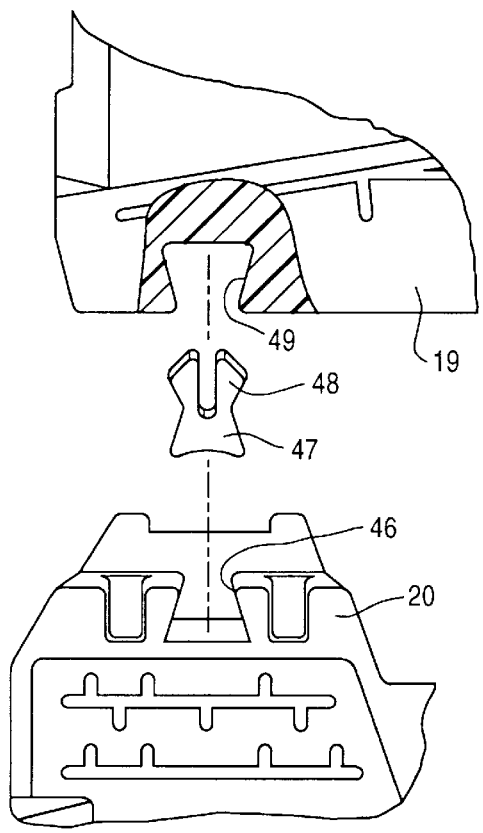
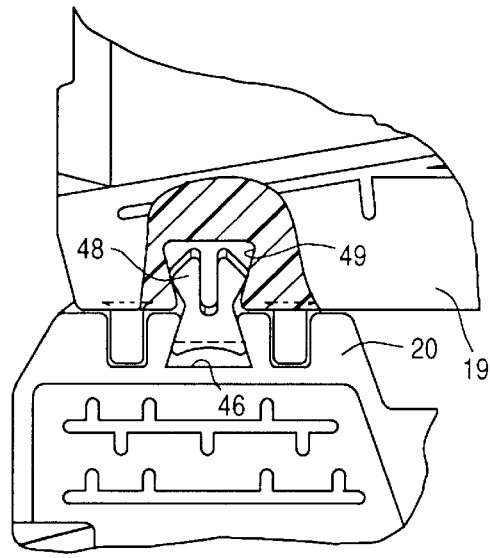
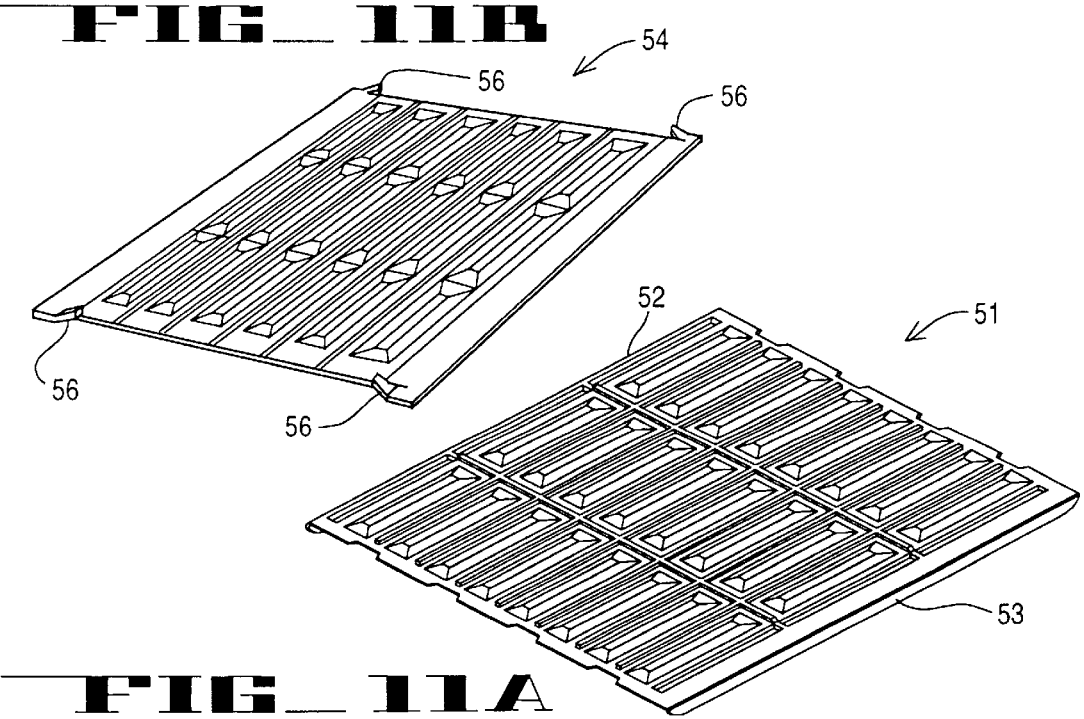

REUSABLE CONTAINER

This is a divisional of application Ser. No. 08/440,527 filed May 12, 1995, now U.S. Pat. No. 5,573,599, which is a divisional of application Ser. No. 08/125,488 filed Sep. 23, 1993, now U.S. Pat. No. 5,450,962.

BACKGROUND OF THE INVENTION

The present invention relates to plastic containers and, more particularly, to a construction of a plastic container that makes the same reusable. While the container is designed for use with produce and other grown food products, by reason of its features it may also desirably be used to contain other commodities.

Many items of produce and other fresh food products are packed in the field in wooden crates and transported to retail outlets in the same. Typically crates of this nature are simply placed in the trash after this single use. This, of course, results in significant environmental problems. Such use not only represents a one-time use of a resource (the wood), it also results in a major waste disposal/land fill problem. Because of these and other problems many in the art have designed plastic containers and container systems. Some of these are made for recycling. Reference is made, for example, to applicant's U.S. Pat. Nos. 3,987,924 and 5,123,533. Patents and patent applications of the same or similar subject matter have also been filed and/or obtained in other countries.

SUMMARY OF THE INVENTION

The present invention relates to a plastic container construction facilitating reuse, and a method of using the plastic container. The plastic container is conventional in that it has a bottom wall with opposed edges from which four side wall structures, a pair of end walls and a pair of side walls extend. In keeping with the broad aspects of the invention, means are provided on the wall structures defining a path for a band of material to secure such wall structures together to form a container cavity with the bottom wall. Most desirably, connecting structures in the form of complementary interlocking constructions on adjacent side edges of the walls also cooperate with such band path defining means for securing the wall structures together.

When the band of material is removed from the remainder of the structure, the walls can be placed in the same plane as the bottom wall—in other words, the container can go from an erect position to a fully collapsed (flat) position so that it easily can be returned. In this connection, each of the wall structures is preferably connected to the bottom wall by a hinge made of plastic—most simply just a thin area of plastic.

It will be appreciated that after a container with this construction is used, for example, to transport a fresh food product, it can be collapsed so that the amount of storage it requires is minimized. It then can be washed and sterilized for reuse while in a flattened condition. The ability to flatten the containers not only minimizes the amount of storage required to transport the same, but also facilitates washing and sterilizing for reuse. Most desirably, the container is made of a plastic material which is not absorbent and therefore does not provide a good host for bacteria growth nor trap residual fumigant gases. All parts of the container are made from the same plastic material so that the container easily can be recycled when it is damaged or after its reuse lifetime.

It has been found that a container incorporating the invention can be reused many times before it must be disposed of. For example, in one implementation of the invention the container is devised to last through 60 reuses over a time span of ten years.

In one realization of the invention, the plastic container of the invention weighed between 2–3 pounds and was intended to compete with wooden and corrugated fiberboard containers manufactured for similar uses. In addition, it was meant to compete with any similar container made from plastic. Prior art plastic containers typically cannot compete against either wood or corrugated fiberboard products from the standpoint of price, because of limitations in the manufacturing methods used to produce them. Virtually all plastic containers are manufactured using the injection molding process to make a single part product. Due to limitations in mold design and raw material flow into the mold, all such products use much more plastic raw material, are much heavier than their intended use requires, have very long cycle times to produce each unit, and are consequently more expensive. While such heavy and expensive plastic containers have certain uses, they can never be cost competitive with wood and corrugated products which have been in use for many decades. Furthermore, a single-part injection molded container weighing only 2 to 3 pounds would not have the strength of the subject plastic container and, when filled with commodity, could not be stacked as high (in cold storage warehouses for example) as the subject container.

The subject container is a fabricated product made from two parts which are manufactured using different manufacturing processes, and joined together using the latest state of the art assembly welding technology. The first part is an extruded polypropylene shell which forms the bottom of the container and its side walls and end walls. The second part are two polypropylene structural foam end frames which are permanently affixed to the shell by means of vibration welding. The shell has four hinge details which allow it to be erected into its assembled stage or collapsed into its flat configuration in 2–3 seconds.

This design takes advantage of the best characteristics of each plastic manufacturing process: the speed of the sheet line extrusion process and the strength achievable with the injection molding process. Since the weight of the contents to be packed into each container is relatively light, the high speed sheet line manufacturing process preferably used. The weight within each container is borne by the thinwall shell which is manufactured using such sheet line extrusion process. The shell also has ribs which provide reinforcement of the shell and reduce flexing of the container. The ribs are formed into the shell on the sheet line. Normally, a sheet line process can only produce a flat surface sheet and cannot incorporate a profile member or detail. Profile parts are manufactured using profile extrusion dies which require special cooling fixtures and other tools to produce. Since strength is required to stack the loaded containers, sometimes as much as three pallet stacks high, the weight bearing load of the pallet stack is distributed through the container's end frames which are made using a very fast special injection molding process system. The rigid structure of the injection molded end frames and the addition of the structural foam into the polypropylene will ensure that the container, when loaded, can be stacked as high as any warehouse can accommodate.

The container of the invention has a feature which makes the same particularly attractive for containing and then dispensing commodities. One of the wall structures of the container is movable between the container position for the same to a position away from the other of the wall structures so as to provide access to the interior of the container. This access is provided even when the container is in a stack of vertically adjacent containers, i.e., when the traditional access through the container lid is blocked. Means are provided for securing such one wall structure in the extended position. In this way, after use of the container of the invention to transport and otherwise handle a supply of commodities, the container can be used to facilitate display and/or selection from the supply.

The reusable container of the invention have many other features. For example, the container includes connector structure which facilitates connection of vertically adjacent containers in a stack. Other features and advantages of the invention either will become apparent or will be described in connection with the following, more detailed description of a preferred embodiment of the invention.

BRIEF DESCRIPTION OF THE DRAWING

With reference to the accompanying five sheets of drawing:

FIG. 1 is an isometric view of a preferred embodiment of the container of the invention in erect condition, showing a lid to be described exploded therefrom;

FIG. 2 is an isometric view illustrating a multiple number of the containers of the invention in a flattened condition;

FIG. 3 is an enlarged partial sectional view taken on a plane indicated by the lines 3—3 in FIG. 2;

FIG. 4 is a plan view showing the preferred embodiment in a flattened condition, the side shown being the opposite of the side shown in FIG. 2;

FIG. 5 is a side elevation view of the preferred embodiment of the container showing one side wall in a position permitting access to the interior of the container;

FIGS. 6A and 6B are enlarged sectional views showing interlocking constructions at the side edges of the walls of the container;

FIG. 7 is an isometric view illustrating a corner edge of the preferred embodiment of the invention;

FIG. 8 is a view similar to FIG. 7 but showing the corner edge without the band of material;

FIG. 9 is a partial isometric view illustrating how two containers which are vertically adjacent one another may be secured together in accordance with the invention;

FIGS. 10A and 10B are enlarged partial views providing a more detailed illustration of the manner in which two vertically adjacent containers may be secured together in accordance with the invention; and FIGS. 11A and 11B are isometric views of alternate lid structures which may be used with the container of the invention.

DETAILED DESCRIPTION OF THE PREFERRED EMBODIMENT(S)

The following relatively detailed description is provided to satisfy the patent statutes. However, it will be appreciated by those skilled in the art that various changes and modifications can be made without departing from the invention.

With reference to the drawings, a preferred embodiment of the container of the invention is generally referred to by the reference numeral 11. It includes a bottom wall 12, a pair of end wall structures 13 and 14 and a pair of side wall structures 16 and 17. (It is to be noted the bottom wall and the side wall structures have extruded ribs formed when the shell providing the bottom and side walls is extruded. The shell is embossed to provide additional strength without adding weight or additional shell thickness.)

Each of the wall structures is connected to its associated bottom edge by a hinge which is made of plastic. In this connection, the whole structure (except for the structural end frames to be discussed) is made as a one-piece plastic part, preferably from polypropylene (PP), with appropriate hinges. That is, the plastic at the junctions between the walls and the bottom edges is made thinner so as to permit the walls to be moved between the two positions represented in FIGS. 1 and 2. It should be realized that the technique of making such hinges from plastic is quite advanced and hinges can be provided which can be cycled many times without adverse consequences.

A band of material 18 circumscribes the walls holding all of the same together to form a container cavity with the bottom wall. Printing or the like showing a grower's logo, the contents of a container, etc., can be included on the band of material at appropriate locations. The location for the band itself is set. The side and end wall structures define a path for the same. This band also is most desirably made of a recyclable material. In this connection, it will be recognized that with reuse of the container (but not the band for each container) there will be many bands which can be shredded and recycled. The band also most desirably is of the same material as the remainder of the container, e.g., polypropylene.

Each of the end walls includes a relatively rigid frame 19. It is the frames 19 of each container which are the main structural members which take the load when the containers are stacked. While each of the end walls is most desirably made from the same plastic material as the bottom and side wall structures of the container. However, each end frame is an injected molded, structural foam part. In this connection, appropriate energy directors are provided in its design to facilitate welding.

Each end frame is positioned against a surface of the end wall of which it is a part as shown in FIG. 3 for connection thereto. In one implementation of the invention this was via vibration welding.

The side edges of each frame include posts 20–23 that are relieved for the band and thus define the basic vertical positioning of such band relative to the wall structures. Each end frame also has a pair of pins 24 and 26 which register with apertures in the band to hold the same generally in position.

It will be appreciated that although it is the side and end wall structures which actually engage the contents of the container, the band 18 adds structural integrity to hold the wall structures together with the bottom wall to form a container cavity. It should be noted that from the broad standpoint one need not provide a band—an exterior wrapping of strong tape will provide the same structural integrity. Moreover, the band and the remainder of the container can be manufactured at separate locations, even by different parties.

The invention includes in addition to the band 18, connecting structure for securing the end and side walls together. The side walls have flaps 29–33 which when the container is assembled with the walls adjacent one another, extend between the frame 19 of each end wall and a plastic filler panel 34 of the end wall (see FIGS. 5 and 6A). In this connection, each frame 19 includes not only the end posts and horizontally connecting members as illustrated, but also a pair of plates 36 and 37. Each end flap 29–33 includes a slot 38 which when the side and end walls are assembled as discussed is engaged by a projecting tab/hooking device 39 on the interior side of each of the respective plates 36 and 37.

Each of the plastic filler panels 34 is slotted adjacent the projection as illustrated at 40. The slots 40 enable that portion of the plastic filler panel between the same to bow under pressure, as is illustrated in FIG. 6B. This bowing facilitates removal of the projection 39 from its associated slot when the side walls are to be disengaged from the end walls.

It will be seen from the above that complementary interlocking constructions are provided on the adjacent edges of the wall structures. In the preferred embodiment being described, the purpose of the interlocking constructions simply is to enable erection of the container and securance of the side walls together before the band 18 is installed. It is the band which provides the structural integrity that is necessary for the container to contain commodities. It will be recognized, though, that depending upon the commodity such a band or an alternative for it may not be necessary in this embodiment of the invention. Moreover, in other realizations of the instant invention the complementary interlocking constructions may be made sufficiently strong to provide the desired structural integrity by themselves.

The above construction facilitates the opening of a side to enable the contents of the container to be seen or to facilitate physical access to such contents. In this connection, means are provided for securing a side wall in a position away from the other of the wall structures and bottom wall making up the container. This is illustrated in FIG. 5. After the band 18 is removed, one of the side walls can be tipped out simply by releasing the detent 39 from the slot 38 in each of the side walls. Means including hole 41 is also provided in each of the flaps 32 to hold the flaps in an extended, but limited, position. The hole 41 in a flap is brought into registration with a hole 42 in its associated end frame plate so that a dowel or pin can be used for securing a side wall in its desired position.

As a major feature of the invention, the container is changeable from a position in which the wall structures define a container as described above to a flat condition in which such wall structures are in generally the same plane as the bottom (see FIG. 2). This aids significantly to the reusability of the container. That is, after use it is only necessary to remove the band by cutting or the like, and then place the container in a flat condition. A plurality of the flattened containers then can be palletized and shipped. In this connection, as illustrated in FIG. 3 protruding lips and tits 43 of one flattened container protrude into its neighbor to aid in positioning containers relative to one another. These tits and lips define a pathway for a lid as will be described when the containers are erected and, thus, have a dual function.

This patent document also discloses the method of washing and sterilizing the containers for reuse while they are still in their flattened condition. As mentioned previously, the plastic material selected for the containers (and for the band) is nonabsorbent. This simplifies the nature of the washing and sterilizing equipment that is necessary. In this connection, it enables easy access to all parts of the container with a brush. Vertically adjacent containers in a stack can be separated to enable a brush to pass therebetween and then the containers passed by appropriate brushes on a continuous conveyor or the like.

Once the containers are washed and sterilized, flattened pallet containers then can be palletized and shipped to a packer, grower or other user for reuse. The ratio of volume used by a flattened palleted container relative to an erected container is approximately 1:8. When the containers are at a packer/grower site, they can be erected. In one implementation of the invention, it takes approximately 3–5 seconds to erect the containers by hand. Machinery can be provided to do so, though, in between 1 and 2 seconds. The band also is applied before a container is reused. In a specific implementation matching the embodiment being described, application of the band by hand is accomplished within about 3–5 seconds. It can be installed by relatively simple and inexpensive machinery in between 1 and 2 seconds.

As another feature each container includes connector structure for securing the container to a generally vertically adjacent container. The connector structure in the particular implementation to be described is designed to provide connection to facilitate handling when the containers are empty or quite light. It is recognized, though, that more structurally strong connector arrangements can be used if desired to enable the containers to be secured together even when relatively heavy. Each of the posts of the end frames includes a dovetail slot at its top surface to capture a clip for such securance. FIG. 9 illustrates the manner in which adjacent containers are stacked on one another, whereas FIGS. 10A and 10B provide details of the construction. Each post, represented by the post 20 in the figures, includes a dovetail slot 46. (It should be mentioned that the views in FIGS. 10A and 10B are the back side of the end frame posts and molding details forming no part of the invention as described are shown.) A clip 47 is provided configured to be captured by the dovetail slot as illustrated. As shown in the drawings, such dovetail slot has opposing walls which define an opening for the clip, which walls are configured relative to the clip to obstruct removal of the clip through such opening. The clip, however, can be slid into the dovetail slot from the end of the same. The upper portion of the clip is defined by a pair of prongs 48 which resiliently can enter and be captured within a complementary dovetail slot 49 on the adjacent upper container. These clips are also most desirably of the same material as the remainder of the container.

FIGS. 11A and 11B illustrate alternate lids for the container. The lid 51 of FIG. 11A includes a pair of edges 52 and 53 which are shaped to capture the upper edge of the container side walls when installed so as to provide additional structural support to the side walls. The lid 54 of FIG. 11B is designed not to extend all the way to the side walls but rather leave a meaningful gap to permit significant air access to a product within the container, as well as "visual access" as is appropriate. This lid is the one shown in the other figures and includes, as is indicated on two opposed end edges, a pair of tabs 56 which register with and fit within corresponding slots 57 defined by the end frame members 19. The lip 42 and the tits 43 on each end define a guide path for the end edges of the lids.

As mentioned at the beginning of the detailed description, protection is not necessarily limited to the specific embodiment described above. Various changes and modifications can be made. The claims, their equivalents and their equivalent language define the scope of protection.

What is claimed is:

1. A reusable plastic container comprising:
   (a) a bottom wall having at least two pair of opposed edges;
   (b) a pair of end wall structures, each of which projects from an associated edge of one of said pair of opposed edges of said bottom wall;
   (c) a pair of side wall structures, each of which projects from an associated edge of the other of said pair of opposed edges of said bottom wall;

(d) hinge means made of plastic connecting each of said wall structures to its associated bottom edge permitting said wall structure to be moved between a position defining a container cavity with the remainder of said wall structures and said bottom wall, and a position in which said wall structure is essentially in the same plane as said bottom wall whereby said container is flat; and (e) means on each of said end wall structures which, when all of said wall structures are in said position essentially in the same plane as said bottom wall, cooperate with another reusable plastic container essentially vertically adjacent the same having said wall structures also essentially in the same plane as its bottom wall, to lock said containers against meaningful movement parallel to said plane relative to one another.

2. The reusable plastic container of claim 1 wherein each of said end wall structures includes a relatively rigid injected molded end frame which is rigidly adhered to an end surface which is integral with said bottom wall.

3. A reusable plastic container comprising:

(a) a bottom wall having at least two pair of opposed edges;

(b) a pair of end wall structures, each of which projects from an associated edge of one of said pair of opposed edges of said bottom wall in essentially the same direction relative to said bottom wall as the other of said end wall structures;

(c) a pair of side wall structures, each of which projects from an associated edge of the other of said pair of opposed edges of said bottom wall in essentially the same direction relative to said bottom wall as said end wall structure; and (d) each of said end wall structures including a relatively rigid end frame rigidly adhered to an end surface that is integral with and lies within the plane of said bottom wall; each of said end frames being defined by a piece of material which is separate and apart from the material defining the end wall structure to which it is adhered, and being positioned and configured to engage a corresponding end frame of a vertically adjacent similar container and distribute weight loading when two or more of such containers are stacked when erected;

(e) hinge means made of plastic connecting each of said wall structures to its associated bottom edge permitting said wall structure to be moved between a position defining a container cavity with the remainder of said wall structures and said bottom wall, and a position in which said wall structure is essentially in the same plane as said bottom wall whereby said container is flat; and wherein each of said end frames cooperate, where all of said wall structures are in said position essentially in the same plane as said bottom wall, with an end frame of another reusable plastic container essentially vertically adjacent the same having said wall structure also essentially in the same plane as its bottom wall, to lock said containers against meaningful movement parallel to said plane relative to one another.

4. A reusable plastic container comprising:

(a) a bottom wall having at least two pair of opposed edges;

(b) a pair of end wall structures each of which projects from an associated edge of one of said pair of opposed edges of said bottom wall in essentially the same direction relative to said bottom wall as the other of said end wall structures;

(c) a pair of side wall structures each of which projects from an associated edge of the other of said pair of opposed edges of said bottom wall in essentially the same direction relative to said bottom wall as said end wall structures;

(d) means on said side and end wall structures defining a path for a band of material to aid in securing said wall structures together to form a container cavity with said bottom wall;

(e) connecting structures in addition to said path defining means for securing said end and side wall structures together;

(f) side edges of adjacent ones of said wall structures being also adjacent one another when said end and side wall structures extend together in said direction, and said connecting structure includes complementary interlocking constructions on adjacent side edges; and (g) at least one pin on said path to register with a cooperable hole in a band of material to position said band properly on said path.

* * * * *